United States Patent Office 3,842,115
Patented Oct. 15, 1974

3,842,115
PROCESS FOR PURIFYING DIAMINOMALEONITRILE
Yoshito Hamamoto, Nakajyo-machi, and Tomio Okada, Yamato, Japan, assignors to Kyowa Gas Chemical Industry Co., Ltd., and Sagami Chemical Research Center, both of Tokyo, Japan
No Drawing. Filed Feb. 2, 1973, Ser. No. 329,026
Claims priority, application Japan, Feb. 14, 1972, 47/15,886, 47/15,887
Int. Cl. C07c 121/20
U.S. Cl. 260—465.5 R    5 Claims

ABSTRACT OF THE DISCLOSURE

A process for purifying diaminomaleonitrile prepared by tetramerizing hydrogen cyanide in a dimethyl formamide or dimethyl sulfoxide solvent in the presence of an alkali catalyst, said process comprising: mixing the reaction mixture obtained by said reaction with at least one liquid selected from the group consisting of aliphatic chlorinated hydrocarbons, aliphatic chlorinated carbon, and aromatic hydrocarbons, subjecting the resulting mixture to a separating operation in order to separate said mixture into a solid component and a liquid mixture, and distilling off the so obtained liquid mixture to recover the diaminomaleonitrile.

---

This invention relates to a process for separating diaminomaleonitrile in the pure form from the reaction mixture obtained by tetramerizing hydrogen cyanide in a dimethyl formamide or dimethyl sulfoxide solvent using an alkali catalyst such as NaCN, NaOH, KCN, NH$_3$, triethylamine, or pyridine.

Several processes for synthesizing the diaminomaleonitrile by using hydrogen cyanide as a raw material have been known. But all of these processes require long reaction periods, showing yields of as low as several percent to 25 percent at best, and are not satisfactory from the industrial standpoint. The present inventors have previously found that diaminomaleonitrile can be obtained with a yield as high as 50% or more if the hydrogen cyanide is reacted in the presence of an alkali catalyst by using a polar aprotic solvent such as dimethyl formamide or dimethyl sulfoxide (see U.S. Pat. 3,701,797 corresponding to Japanese patent application 35,044/69 and Japanese patent application 62,691/69). But it was recently discovered that with such a process, since the solvents used are all of high boiling point, even if it is intended to separate the diaminomaleonitrile from the reaction mixture by means of distillation or evaporation after the completion of the reaction, the reaction further proceeds causing the formed diaminomaleonitrile to be repolymerized, thus seriously affecting the yield. A more undesirable fact is that the diaminomaleonitrile, high-boiling point products, and catalyst dissolved in the system, help increase the boiling point, and make it impossible to fully recover the solvent by distillation under the reduced pressure conventionally employed. Also, the crude diaminomaleonitrile so obtained will often be colored having poor purity, and will require some purification. The purification method, in general, may be a method to sublime said nitrile under reduced pressure, or a method of recrystallizing said nitrile by using hot water or alcohol. But either method is complex in processing operations and is not preferable from an industrial viewpoint.

The present inventors have conducted intensive research aiming at completely recovering the expensive solvent from such a complex reaction mixture, and in order to separate and purify the diaminomaleonitrile without decreasing the yield of the maleonitrile as a final product, and finally arrived at the completion of this invention. According to this invention, there is provided a process for purifying the diaminomaleonitrile which is prepared by tetramerizing hydrogen cyanide in a dimethyl formamide or dimethyl sulfoxide solvent in the presence of an alkali catalyst. The process for purifying the diaminomaleonitrile of this invention consists of mixing the reaction mixture obtained from said reaction with at least one liquid selected from the group consisting of aliphatic chlorinated hydrocarbons, aliphatic chlorinated carbon, and aromatic hydrocarbons, subjecting the resulting mixture to a separating operation in order to separate said resulting mixture into a solid component and a liquid mixture, and recovering the diaminomaleonitrile by distilling the obtained liquid mixture. By means of the above-mentioned process, the expensive reaction solvent is recovered efficiently, and diaminomaleonitrile which is a final product is recovered maintaining a purity as high as 90% or more, and, at times as high as 95%. Furthermore, the most important merit of this invention is that high yield and high purity are achieved simultaneously.

The process of this invention is illustrated in detail below.

Preferable examples of aliphatic chlorinated hydrocarbons which will be mixed into the reaction mixture obtained by tetramerizing hydrogen cyanide in the presence of an alkali catalyst in a polar aprotic solvent, are methylene chloride, chloroform, 1,2-dichloroethane, ethylene dichloride, trichloroethylene, and tetrachloroethane. The aliphatic carbon chloride is preferably carbon tetrachloride. Examples of the hydrocarbons are aromatic hydrocarbons such as benzene, toluene, 1,2,4-trimethylbenzene tnd xylene. These liquids may be used alone or in combination of two or more kinds. It is desired that the amount of the liquid which will be mixed with the reaction mixture be about 3 to 20 times by volume, or preferably from 5 to 10 times by volume on the basis of the volume of the reaction mixture.

Methods of mixing said liquid into said reaction mixture include; a method in which the liquid is added to the reaction mixture at room temperature or at an elevated temperature and stirred together, and a method in which the reaction mixture is added to said liquid at room temperature or at an elevated temperature, and stirred and mixed together. By means of said mixing operation, high polymers and catalysts present as impurities in the reaction mixture can easily be separated out as solid substances, and the desired product (diaminomaleonitrile) can be easily separated as a liquid mixture. By subjecting the resulting liquid mixture containing diaminomaleonitrile to an ordinary distillation or to distillation under reduced pressure, it is possible to separate out diaminomaleonitrile having a purity of 90% or more, as well as to easily recover the aliphatic chlorinated hydrocarbons, aliphatic chlorinated carbon, or hydrocarbons, and dimethyl formamide or dimethyl sulfoxide.

The process of this invention mentioned above makes it possible to obtain the diaminomaleonitrile in a high purity. But it is often required to obtain the diaminomaleonitrile with a still higher purity. Diaminomaleonitrile having such a high purity can be obtained by utilizing another embodiment of this invention. This embodiment comprises the process of this invention mentioned earlier, wherein said diaminomaleonitrile being recovered is further subjected to washing with at least one liquid selected from the group consisting of aliphatic chlorinated hydrocarbons, aliphatic chlorinated carbon, and aromatic hydrocarbons, said diaminomaleonitrile is extracted with a solvent, and said diaminomaleonitrile is separated from the extraction mixture. By means of this modified process, it is possible to obtain diaminomaleonitrile having a purity of as high as about 99 to 99.5%. The liquid used for the purpose of washing said diaminomaleonitrile is quite the same as the liquid mixed into the reaction mixture which contains crude diaminomaleonitrile for the purpose of purifying the diaminomaleonitrile. The washing method consists of introducing the diaminomaleonitrile which will be purified into said liquid, and stirring the resulting mixture at room temperature or at an elevated temperature. A lower carboxylic acid ester such as methyl acetate, ethyl acetate, isopropyl acetate, butyl acetate, methyl propionate and ethyl propionate; ether such as ethyl ether, dioxane and tetrahydrofurane; lower aliphatic nitrile such as acetonitrile and propionitrile, or alcohol such as ethanol, propanol, iso-propanol and iso-butanol; may be added to the solid substance remaining after the washing, followed by the extraction processing. By separating the diaminomaleonitrile from the so obtained extraction solvent by a conventional method such as distillation or filtration, the purity of the diaminomaleonitrile can be increased considerably. The invention is illustrated below with reference to the examples.

EXAMPLE 1

100 milliliters of dimethyl formamide and 5 g. of sodium cyanide were introduced into a 200 ml. pressure bottle and dissolved therein. Hydrogen cyanide (30 ml.) was added and reacted for 4 hours at 70° C. The resulting black reaction mixture liquid was poured into 600 ml. trichloroethylene with stirring, followed by total refluxing for 10 minutes in order to perform a complete mixing, and was then cooled. The liquid obtained was filtered through a glass filter (No. 2), and a black polymer containing sodium cyanide was obtained on the filter as a solid component, and a reddish transparent liquid was obtained as a filtrate. By distilling said liquid, trichloroethylene was recovered under atmospheric pressure and dimethyl formamide was recovered under a reduced pressure of 20 mm. Hg. 12 grams of diaminomaleonitrile having a purity of 90% was obtained as a residue.

EXAMPLE 2

100 milliliters of dimethyl sulfoxide and 5 g. of sodium cyanide were introduced into a 200 ml. pressure bottle and dissolved therein. Hydrogen cyanide (46 ml.) was added and reacted for 4 hours at 70° C. The resulting reaction mixture was added to 1000 ml. chloroform at room temperature with stirring and mixed sufficiently. The mixture was then filtered through a glass filter (No. 2). By separating solid substances, a reddish liquid mixture was obtained. By distilling said liquid, chloroform was recovered under atmospheric pressure and dimethyl sulfoxide was recovered under reduced pressure. About 18 g. of diaminomaleonitrile having a purity of about 90% was obtained as a residue.

EXAMPLE 3

The reaction was carried out in the same manner as in Example 2. To the resulting reaction mixture was added tetrachloroethane in an amount of 20 times on the basis of said reaction mixture, and mixed together at room temperature. The resulting mixture was filtered through a glass filter (No. 2). By separating solid substances, a reddish liquid mixture was obtained. The liquid mixture was extracted with 100 ml. of water. By distilling the so obtained extraction mixture under reduced pressure, and distilling off water and dimethyl sulfoxide, 16 g. of diaminomaleonitrile having a purity of about 90% was obtained as a residue.

EXAMPLE 4

The reaction was carried out in the same manner as in Example 1. 60 grams of the so obtained reaction mixture was added with stirring to 1500 ml. of xylene heated at 100° C., and mixed together and maintained at its temperature for 15 minutes. Black solid substances were removed in the same manner as in Example 1, and the liquid was distilled at a reduced pressure of 60 mm. Hg. 5.0 grams of diaminomaleonitrile having a purity of about 98% was obtained.

EXAMPLE 5

The reaction was conducted in the same manner as in Example 1. 60 grams of the so obtained reaction mixture was added with stirring to 1000 ml. of pseudocumene (1,2,4-trimethylbenzene) heated at 100° C., and mixed together and maintained at this temperature for 15 minutes. Black solid substances were separated by filtration, and the resulting liquid was subjected to distillation under a reduced pressure of 40 mm. Hg in order to distill off dimethyl formamide and pseudocumene. 5.1 grams of diaminomaleonitrile having a purity of about 90% was obtained.

EXAMPLE 6

20 grams of black diaminomaleonitrile having a purity of about 90% obtained in accordance with Example 2 was introduced into 300 ml. of toluene, and was stirred and washed therein sufficiently for 10 minutes at room temperature. The mixture was filtered to remove toluene. To the resulting diaminomaleonitrile was added 500 ml. of methyl acetate, and the mixture was refluxed to effect extraction. The operation of separating a faintly yellow methyl acetate solution so formed was effected by distilling the extraction liquid under reduced pressure thereby distilling off the methyl acetate. A faintly yellow diaminomaleonitrile powder was obtained as a residue. The powder was then dried at 30° C. under reduced pressure and the diaminomaleonitrile was obtained in an amount of 17 g. Analysis by means of an ultraviolet ray absorption spectrum showed the purity to be 99.0%.

EXAMPLE 7

20 grams of black diaminomaleonitrile having a purity of about 90% obtained in accordance with Example 1 was introduced into 300 ml. of trichloroethylene, and the mixture was heated and refluxed for 10 minutes to effect washing. The mixture was then filtered to remove trichloroethylene. To the resulting diaminomaleonitrile was added 500 ml. of ethyl acetate, and the mixture was refluxed and cooled. By separating a polymer by means of filtration, a faintly yellow ethyl acetate solution was obtained. To said solution was added trichloroethylene in an amount of 3 times to cause the precipitation of diaminomaleonitrile. The precipitate was separated by filtration. The precipitate obtained was dried under reduced pressure, and 15 g. of a faintly yellow diaminomaleonitrile powder (purity, 99.5%) was obtained.

EXAMPLE 8

20 grams of black diaminomaleonitrile having a purity of about 90% obtained in accordance with Example 1 was introduced into 300 ml. of carbon tetrachloride. The resulting mixture was heated and refluxed to effect washing. The mixture was then filtered to remove carbon tetrachloride. To the resulting diaminomaleonitrile was added 500 ml. of isobutyl alcohol. The mixture was heated at 100° C., and was filtered while it was still hot in order to remove the polymer. An extraction solution with an isobutyl alcohol was obtained. The solution was then cooled to cause faintly yellow diaminomaleonitrile to be recrystallized. The crystal was separated by filtration. The crystal so obtained was dried under reduced pressure, and 15 g. of a faintly yellow diaminomaleonitrile powder (purity, 98.5%) was obtained.

What is claimed is:
1. In a process for the production of diaminomaleonitrile prepared by tetramerizing hydrogen cyanide in a dimethyl formamide or dimethyl sulfoxide solvent in the presence of an alkali catalyst, the improvement comprising recovering purified diaminomaleonitrile by:
 (A) mixing the entire reaction mass of the above preparation (containing diaminomaleonitrile, high boil- ing point by-products, dimethyl formamide or dimethyl sulfoxide, and an alkali catalyst) with at least one liquid selected from the group consisting of:
   (1) an aliphatic chlorinated hydrocarbon which is methylene chloride, chloroform, 1,2-dichloroethane, ethylene dichloride, trichloroethylene, or tetrachloroethane;
   (2) an aliphatic carbon chloride which is carbon tetrachloride; and
   (3) an aromatic hydrocarbon which is benzene, toluene, xylene or 1,2,4-trimethylbenzene
with the provisos that the amount of liquid is 3 to 20 times by volume of the volume of the entire reaction mass and the mixing temperature is at least room temperature;
(B) separating the mixture into a solid component containing undesirable impurities and a liquid mixture; and
(C) distilling off the liquid mixture to recover the purified diaminomaleonitrile.

2. The improvement of claim 1 in which the liquid is present in an amount of from 5 to 10 times by volume of the volume of the entire reaction mass.

3. The improvement of claim 1 in which the liquid is 1,2,4-trimethylbenzene.

4. The improvement of claim 1, with the additional steps of:
(D) mixing the purified diaminomaleonitrile with at least one liquid selected from those listed in step (A), at a temperature of at least room temperature;
(E) extracting the purified diaminomaleonitrile from the mixture of step (D) by using a solvent selected from at least one of the group consisting of:
   (1) a lower carboxylic acid ester which is methyl acetate, ethyl acetate, isopropyl acetate, methyl propionate or ethyl propionate;
   (2) an ether which is ethyl ether, dioxane, or tetrahydrofurane;
   (3) a lower aliphatic nitrile which is acetonitrile or propionitrile; and
   (4) an alcohol which is ethanol, propanol, isopropanol, or iso-butanol; and
(F) separating the purified diaminomaleonitrile from the extraction mixture, to yield twice-purified diaminomaleonitrile.

5. The improvement of claim 4 in which the liquid is 1,2,4-trimethylbenzene in step (A).

References Cited
UNITED STATES PATENTS

| | | | |
|---|---|---|---|
| 3,701,797 | 10/1972 | Okada et al. | 260—465.5 R |
| 3,666,787 | 5/1972 | Webster | 260—465.5 R |
| 3,629,318 | 12/1971 | Webster | 260—465.5 R |

JOSEPH P. BRUST, Primary Examiner